(12) United States Patent
Ruan et al.

(10) Patent No.: US 10,243,816 B2
(45) Date of Patent: Mar. 26, 2019

(54) AUTOMATICALLY OPTIMIZING NETWORK TRAFFIC

(71) Applicant: International Business Machines Corporation, Armonk, NY (US)

(72) Inventors: Shi X. Ruan, Wuxi (CN); Hui Q. Shi, Beijing (CN); Yi B. Wang, Beijing (CN); Chao C. Yu, Ningbo (CN); Qing F. Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 15/132,110

(22) Filed: Apr. 18, 2016

(65) Prior Publication Data
US 2017/0302542 A1    Oct. 19, 2017

(51) Int. Cl.
*H04L 12/26* (2006.01)
*H04L 12/24* (2006.01)

(52) U.S. Cl.
CPC ............ *H04L 43/04* (2013.01); *H04L 43/062* (2013.01); *H04L 43/0864* (2013.01); *H04L 41/5019* (2013.01); *H04L 43/10* (2013.01)

(58) Field of Classification Search
CPC ...................................................... H04L 43/04
See application file for complete search history.

(56) References Cited

U.S. PATENT DOCUMENTS

| | | | |
|---|---|---|---|
| 8,738,972 B1 * | 5/2014 | Bakman | G06F 11/0712 714/47.1 |
| 8,909,785 B2 | 12/2014 | Franco et al. | |
| 2005/0132362 A1 | 6/2005 | Knauerhase et al. | |
| 2008/0049631 A1 * | 2/2008 | Morrill | H04L 41/5009 370/250 |
| 2011/0246627 A1 | 10/2011 | Kern | |
| 2014/0237479 A1 | 8/2014 | Baset et al. | |
| 2015/0120923 A1 | 4/2015 | Kruglick | |

(Continued)

OTHER PUBLICATIONS

Weiwei Fang et al., "VMPlanner: Optimizing Virtual Machine Placement and Traffic Flow Routing to Reduce Network Power Costs in Cloud Data Centers", Comput. Netw. (2012), [online], Retrieved from the Internet. <http://dx.doi.org/10.1016/j.comnet.2012.09.008>, all pages.

*Primary Examiner* — Suraj M Joshi
(74) *Attorney, Agent, or Firm* — Law Offices of Ira D. Blecker, P.C.

(57) ABSTRACT

An apparatus for optimizing network traffic which includes a host computer having virtual machines (VMs); a monitoring module to collect network traffic data from the VMs; an analysis engine to receive the network traffic data from the monitoring module and to calculate metric values pertaining to the network traffic data; a pattern module to store network traffic patterns having metric values and to provide the network traffic patterns to the analysis engine, the analysis engine compares the calculated metric values to the network traffic pattern metric values and provides an output of a result of the compare of the calculated metric values to the network pattern metric values; and responsive to receipt of the output from the analysis engine, an optimization module processes the output and provides an optimization action to the VMs to improve the flow of the network traffic between the VMs.

18 Claims, 7 Drawing Sheets

(56) References Cited

U.S. PATENT DOCUMENTS

2016/0072669 A1* 3/2016 Saavedra ............ H04L 12/2867
709/220
2016/0359872 A1* 12/2016 Yadav .................... H04L 43/04

* cited by examiner

FIG. 6
| Key | | Data | | |
|---|---|---|---|---|
| Pattern ID | Traffic Cycle | Traffic Interval | Traffic Intensity | Traffic Variance Threshold | RTT Thresholds |
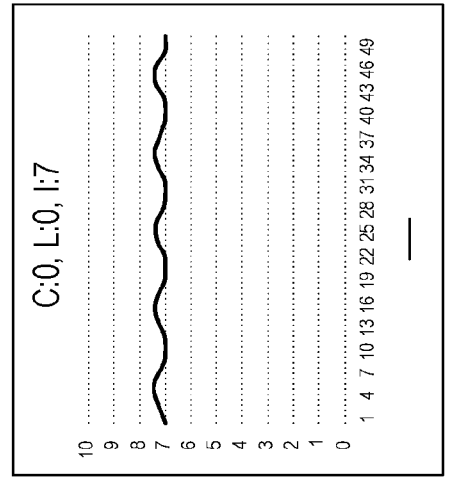
FIG. 7C
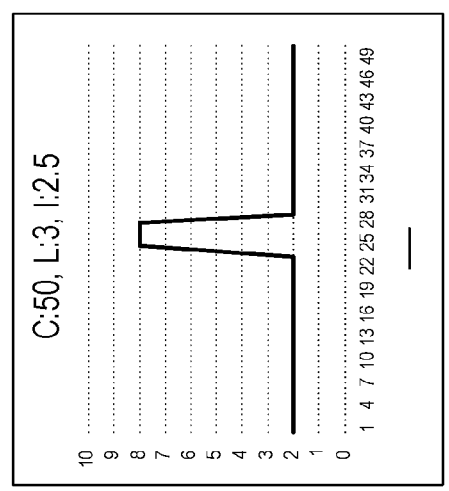
FIG. 7B
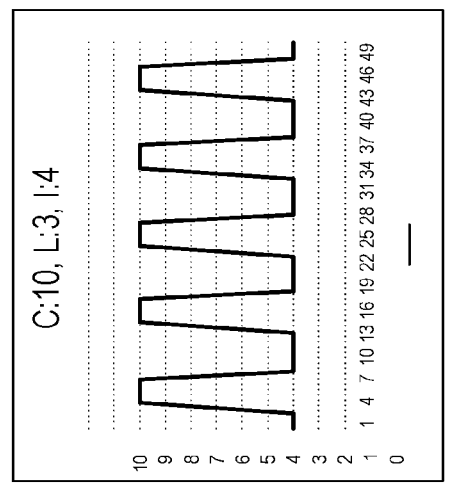
FIG. 7A

AUTOMATICALLY OPTIMIZING NETWORK TRAFFIC

BACKGROUND

The present exemplary embodiments pertain to a network environment and, more particularly pertain to a method, apparatus and computer program product for optimizing the traffic that flows through the network environment. In one preferred environment, the network environment may be a cloud environment.

Cloud computing is a kind of Internet-based computing, where shared resources, data and information are provided to computers and other devices on-demand. Cloud computing and storage solutions provide users and enterprises with various capabilities to store and process their data in third-party data centers.

Cloud computing is a model for enabling ubiquitous, convenient, on-demand network access to a shared pool of configurable computing resources (e.g., networks, servers, storage, applications and services) that can be rapidly provisioned and released with minimal management effort.

Cloud computing may allow companies to avoid upfront infrastructure costs, and focus on projects that differentiate their businesses instead of on infrastructure. Cloud computing may also allow companies to get their applications up and running faster, with improved manageability and less maintenance, and further may allow the companies to more rapidly adjust resources to meet fluctuating and unpredictable business demand.

The present availability of high-capacity networks, low-cost computers and storage devices as well as the widespread adoption of hardware virtualization has led to a growth in cloud computing. Companies can scale up as computing needs increase and then scale down again as demands decrease.

Cloud computing is increasingly recognized as a cost effective means of delivering information technology services through a virtual platform rather than hosting and operating the resources locally. Modern clouds enable system administrators to build highly customized virtual machines to meet a huge variety of end user requirements.

BRIEF SUMMARY

The various advantages and purposes of the exemplary embodiments as described above and hereafter are achieved by providing, according to an aspect of the exemplary embodiments, an apparatus for optimizing network traffic comprising: at least one host computer having virtual machines (VMs) and a virtual machine placement of the VMs with respect to the at least one host computer; a monitoring module to collect network traffic data from the VMs; an analysis engine to receive the network traffic data from the monitoring module and to calculate predetermined metric values pertaining to the network traffic data; a pattern module to store network traffic patterns having predetermined metric values and to provide the network traffic patterns to the analysis engine, the analysis engine compares the calculated predetermined metric values to the network traffic pattern predetermined metric values and provides an output of a result of the compare of the calculated predetermined metric values to the network pattern predetermined metric values; and responsive to a receipt of the output from the analysis engine, an optimization module processes the output and provides an optimization action to the VMs to improve the flow of the network traffic between the VMs.

According to another aspect of the exemplary embodiments, there is provided a computer implemented method of optimizing network traffic in a network environment comprising at least one host computer having virtual machines (VMs) and a virtual machine placement of the VMs with respect to the at least one host computer, the method comprising: collecting by a monitoring module network traffic data from the VMs; receiving by an analysis engine the network traffic data from the monitoring module; calculating by the analysis engine predetermined metric values pertaining to the network traffic data; storing in a pattern module network traffic patterns having predetermined metric values; retrieving by the pattern module a matched network traffic pattern having the predetermined metric values matching the calculated predetermined metric values; providing by the pattern module the matched network traffic patterns to the analysis engine; comparing by the analysis engine the calculated predetermined metric values to the matched network traffic pattern predetermined metric values and providing an output of a result of the comparing of the calculated predetermined metric values to the matched network pattern predetermined metric values; and responsive to receiving by an optimization module the output from the analysis engine, providing by the optimization module an optimization action to the VMs to improve the flow of the network traffic between the VMs.

According to a further aspect of the exemplary embodiments, there is provided a computer program product for optimizing network traffic in a network environment, the computer program product comprising a computer readable storage medium having program instruction embodied therewith, the program instructions executable by a computer environment comprising at least one host computer having virtual machines (VMs) and a virtual machine placement of the VMs with respect to the at least one host computer to cause the computer environment to perform a method comprising: collecting by a monitoring module network traffic data from the VMs; receiving by an analysis engine the network traffic data from the monitoring module; calculating by the analysis engine predetermined metric values pertaining to the network traffic data; storing in a pattern module network traffic patterns having predetermined metric values; retrieving by the pattern module a matched network traffic pattern having the predetermined metric values matching the calculated predetermined metric values; providing by the pattern module the matched network traffic patterns to the analysis engine; comparing by the analysis engine the calculated predetermined metric values to the matched network traffic pattern predetermined metric values and providing an output of a result of the comparing of the calculated predetermined metric values to the matched network pattern predetermined metric values; and responsive to receiving by an optimization module the output from the analysis engine, providing by the optimization module an optimization action to the VMs to improve the flow of the network traffic between the VMs.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 6 depicts the format of a pattern in a pattern repository of the apparatus.

FIG. 7A, FIG. 7B and FIG. 7C depict the three metric values of FIG. 5 with respect to three network traffic usage scenarios.

DETAILED DESCRIPTION

Figure 1:
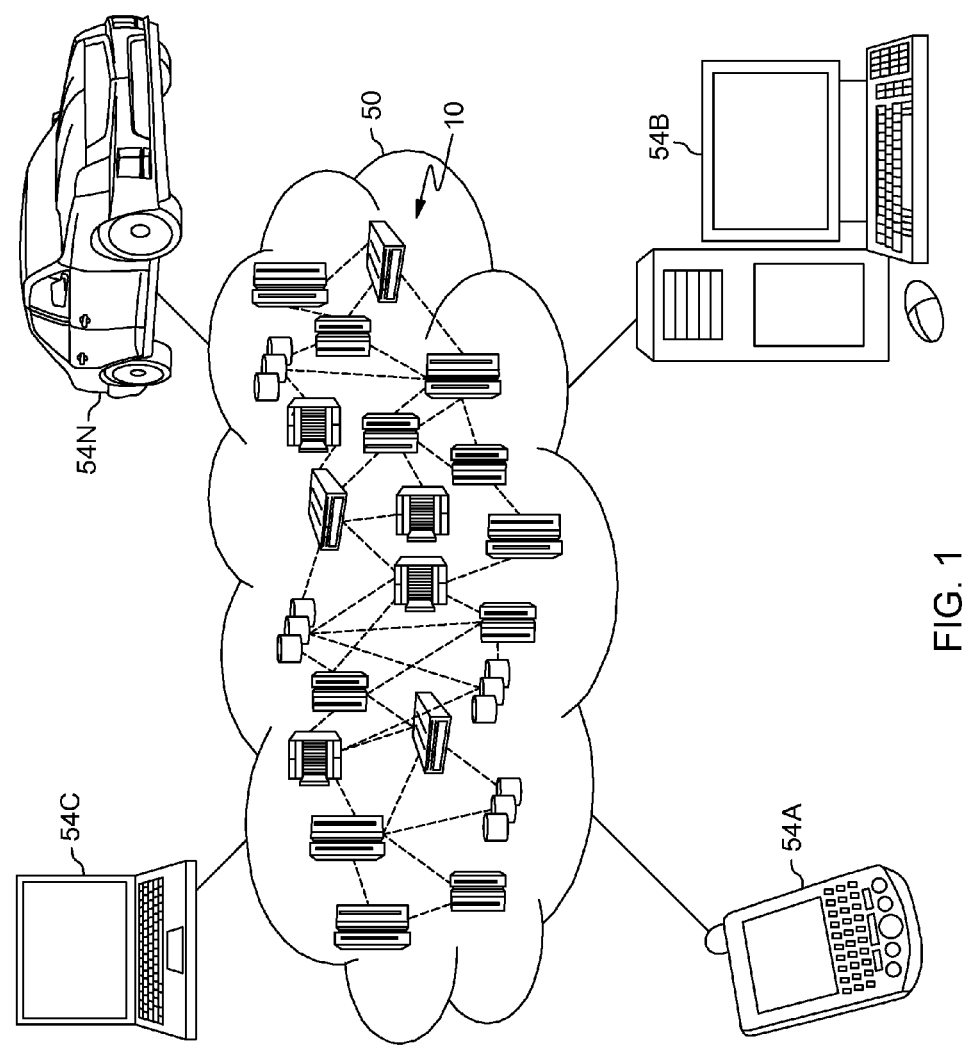
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
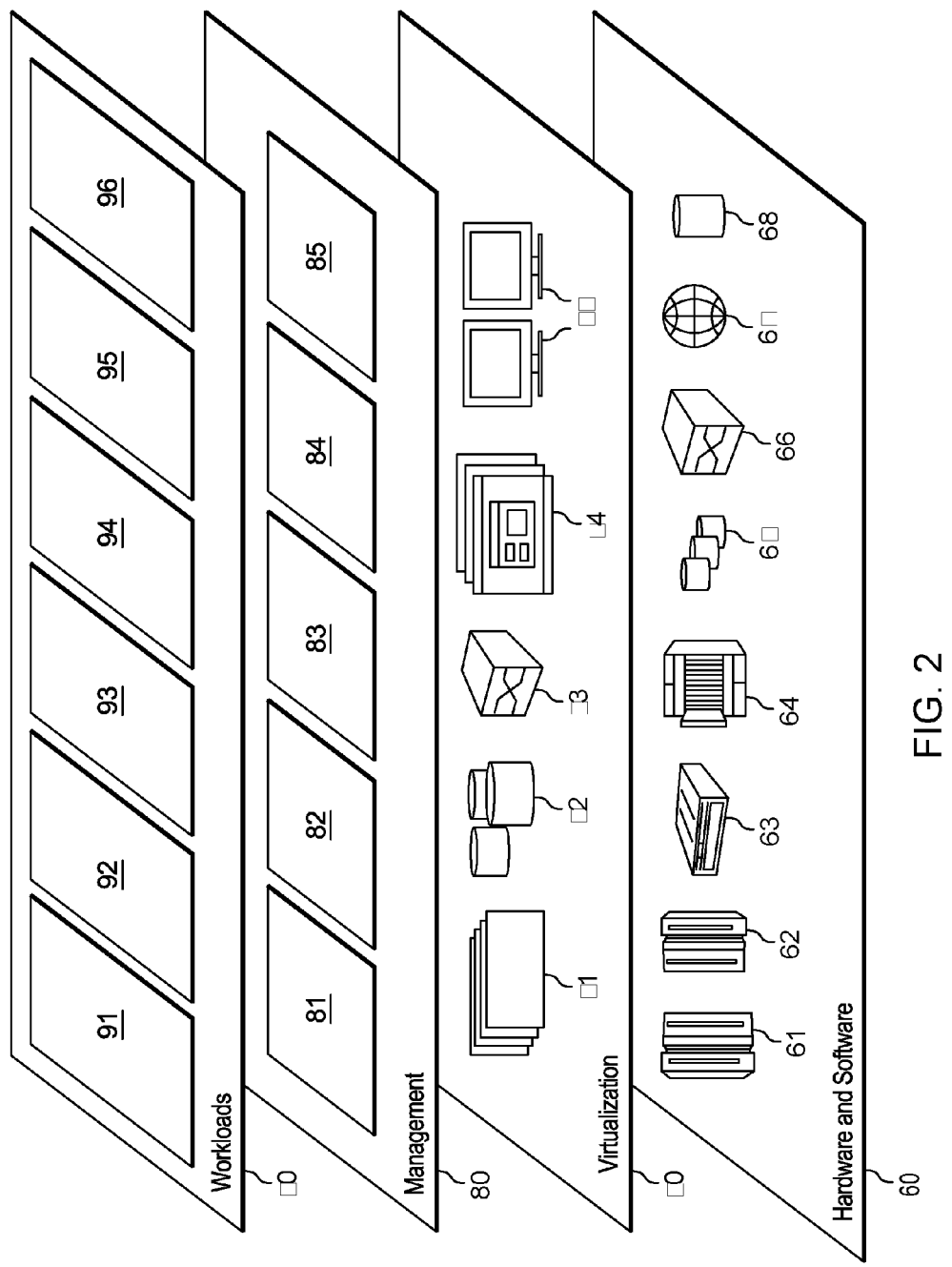
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 95.

The exemplary embodiments introduce a method, apparatus and computer program product for dynamically optimizing network traffic based on historic inbound and outbound network traffic analysis and pattern discovery.

One exemplary embodiment pertains to dynamically optimizing cloud network traffic based on historic inbound and outbound network traffic analysis and pattern discovery and, in this regard pertains to the virtualization layer 70 shown in FIG. 2. The virtual entities referred to above in the virtualization layer 70 may hereafter generically be referred to as virtual machines (VMs).

While the following description is particularly directed to a cloud environment, it should be understood that the principles of the exemplary embodiments may apply equally to any network traffic environment in which there are VMs.

In present practice for an infrastructure cloud, regardless of whether it is a public, private, community or hybrid cloud, there may be rare consideration of a VM's affinity and network traffic when placing new VMs or optimizing existing VMs.

Even when VM pattern/orchestration may be considered in infrastructure cloud design, unplanned new VM additions catering for elastic workload balancing or high availability setup for hosted applications may frequently break up the original orchestration design and topology.

Further, there may be unnecessary network traffic and a communication bottleneck due to dispersed VMs with heavy communication workload on the dispersed VMs. For example, for two related VMs where one VM may be an application server and the other VM may be a database server, they may be located in two separate virtual local area networks (VLANs) and two distant hosts. In this case, all of their network traffic may go up to an aggregation layer switch or a core layer switch.

The central concepts of the exemplary embodiments include:

VM Affinity determination: The affinity of VMs may be determined by analyzing the historic inbound and outbound network traffic communication between VMs and by pattern discovery. "VM Affinity" may be defined as a traffic volume correlation index between VMs. A larger correlation index means greater traffic volume between VMs which, in turn, means larger VM Affinity between VMs. Related VMs may be automatically re-placed with high affinity VMs into one host or one VLAN. For example, as noted above, one VM that works as a database server may have a high affinity with another VM which works as an application server.

Automatic Network Traffic Pattern Match: Automatic network traffic pattern match may be found for VMs through a pattern detection engine, pattern meta data metrics, and a pattern repository.

Automatic Optimization of Network Traffic: The VMs network traffic may be dynamically optimized by re-placing (i.e., moving) existing VMs of high affinity into one host or one VLAN, and/or by redefining the routing path of the traffic.

Figure 3:
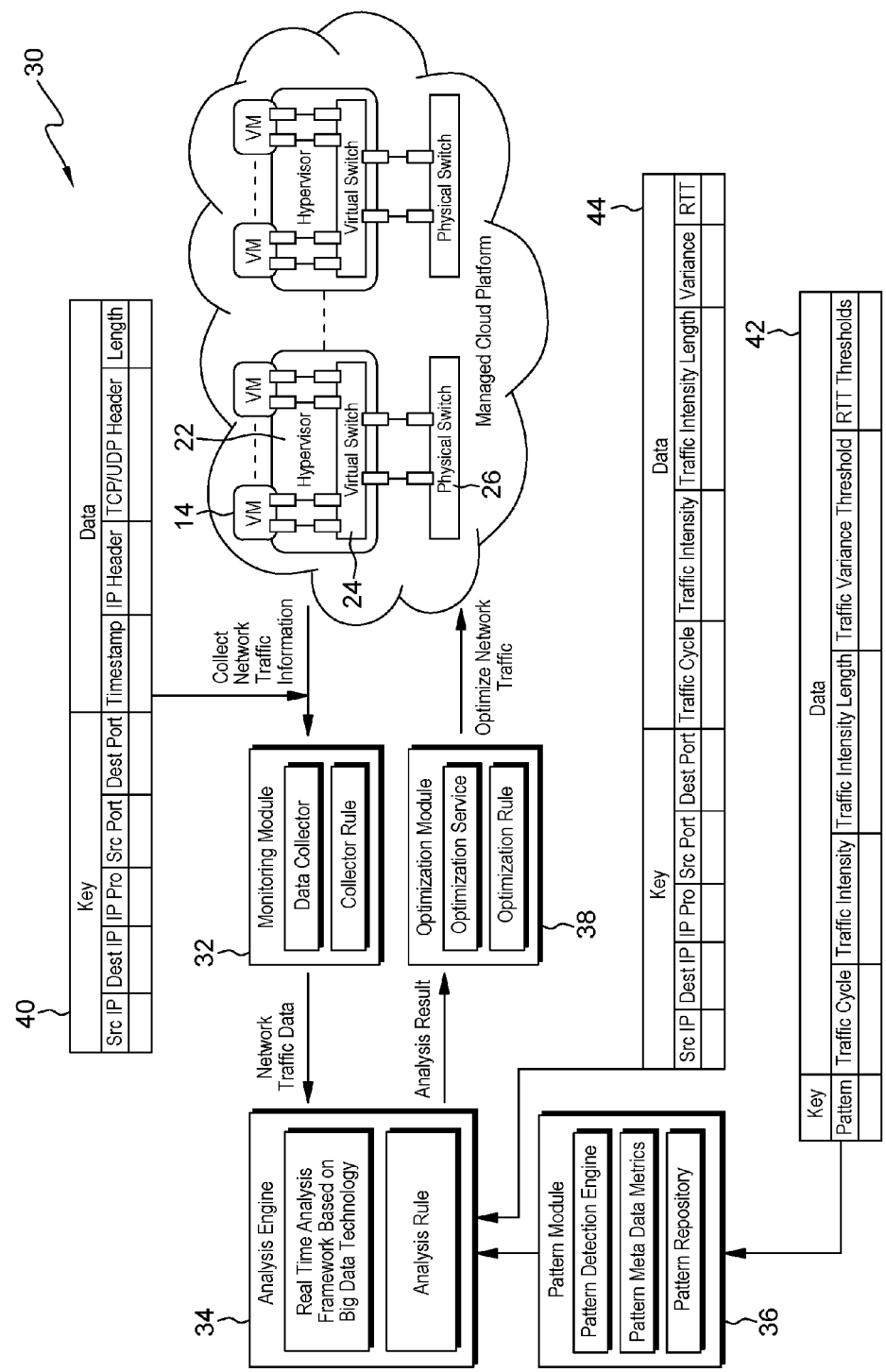
FIG. 3 depicts an exemplary embodiment of an apparatus for optimizing network traffic which may be used in the cloud computing environment of FIGS. 1 and 2.

Referring to the Figures in more detail, and particularly referring to FIG. 3, cloud computing environment 50 (FIG. 1) is shown in more detail which illustrates an exemplary embodiment of an apparatus 30 for optimizing network traffic in the cloud computing environment 50. Apparatus 30 may represent one node 10 illustrated in FIG. 1. The apparatus 30 may include a monitoring module 32, an analysis engine 34, a pattern module 36 and an optimization module 38.

The apparatus 30 may include VMs 14 which may be managed by a hypervisor 22 or similar component. There may be also one or more switches, one of which may be a virtual switch 24 and another one may be a physical switch 26. The virtual switch 24 may be located in the hypervisor 22. An example of a virtual switch 24 may be Openvswitch or Linux bridge. Alternatively, the physical switch 26 may be external to the hypervisor to route and/or switch network traffic between hypervisors. Cisco and Juniper Networks both manufacture physical switches for routing and/or switching network traffic.

There may not be the need for both a virtual switch 24 and a physical switch 26 but preferably there should be at least one of the virtual switch 24 and physical switch 26 to send the network traffic information to the monitoring module 32.

The monitoring module 32, analysis engine 34, pattern module 36 and optimization module 38 may be located in the physical server hardware, the VMs or a container. Further, the monitoring module 32, analysis engine 34, pattern module 36 and optimization module 38 may be located all in the same physical server hardware, VM or container or each of the monitoring module 32, analysis engine 34, pattern module 36 and optimization module 38 may be located in different physical server hardware, VM or container.

Broadly speaking, the monitoring module 32 collects network traffic information and provides the network traffic information to the analysis engine 34 for analysis. The analysis engine 34 may receive input from the pattern module 36. The results of the analysis may be provided to the optimization module 38 which may then optimize network traffic by moving VMs from one host or VLAN to another host or VLAN and/or by re-routing the network traffic. Each of these components of the apparatus 30 will be described in more detail.

The monitoring module 32 sniffs the network traffic information from the VMs to get the network traffic information. The monitoring module 32 may work by a two step process. In a first step, the virtual switch 24 and/or the physical switch 26 sniffer all the traffic information, and send the traffic information to the data collector of the monitoring module 32 immediately after it sniffs the packet information. Alternatively, the traffic information may be stored locally inside the virtual switch 24 and/or the physical switch 26 and then fetched by the data collector. The packet information stored inside the virtual switch 24 and/or the physical switch 26 may then be freed. In a second step, the data collector listens to the traffic information sent from the virtual switch 24 and/or the physical switch 26. Alternatively, the data collector may poll the virtual switch 24 and/or the physical switch 26 periodically.

The monitoring module 32 further includes a collector rule having several functions. In one function, the collector rule may dictate how the monitoring module 32 gets the packet information which may be by the monitoring module 32 waiting for the virtual switch 24 and/or the physical switch 26 to send the packet information or by the monitoring module 32 polling, at an interval set by the collector rule, the virtual switch 24 and/or the physical switch 26 and fetching the packet information. In a second function, the collector rule may include a switch IP list which may list the switches that the monitoring module 32 may listen to or poll.

The monitoring module 32 may collect data such as the packet timestamp when the packet is received, the packet IP header, the TCP/UDP header and the packet length. This information may be organized in a table 40 such as that shown in FIG. 3. Table 40 represents the data format of the traffic information that the monitoring module 32 receives from the virtual switch 24 and/or the physical switch 26. More specifically, the following information may be presented in table 40: Source IP, Destination IP, IP Protocol, Source Port, Destination Port, Packet Length, IP header, TCP/UDP header and Timestamp of the packet.

The information from the monitoring module 32 is passed to the analysis engine 34. The analysis engine 34 may calculate from this information the packet rate and round trip time (RTT) for each packet for each network session. The RTT is the length of time it takes a data packet to be sent plus the length of time it takes for an acknowledgment of receipt of that data packet to be received by the sender.

For a single packet, the RTT is the time span starting from sending a TCP packet to a TCP peer and ending at receiving a TCP ACK packet. For a typical TCP session there are many packets and RTT is the average round trip time after the last packet. The following notation may be used:

$rtt_i$=time between transmission of $i^{th}$ packet until receipt ACK of $i^{th}$ packet RTT=estimate of average round trip time after $i^{th}$ packet The RTT may be further written as:

$RTT=\alpha*RTT+((1-\alpha)*rtt_i)$ where a is a constant weighting factor ($0 \leq \alpha < 1$). Choosing a value of a close to 1 makes the average RTT immune to changes that last a short time (e.g., a single segment that encounters long delay). Choosing a value for a close to 0 makes the average RTT respond to changes in delay very quickly. One suggestion for a is between 0.8~0.9.

A session (may also be referred to as a network session) is an interacting exchange between communicating devices. In the context of the exemplary embodiments, a session means a TCP/IP quintuple to include source IP, destination IP, IP protocol, TCP/UDP source port and TCP/UDP destination port. The RTT may be calculated from the packet information, such as the TCP header, to get the RTT of each session.

Figure 4:
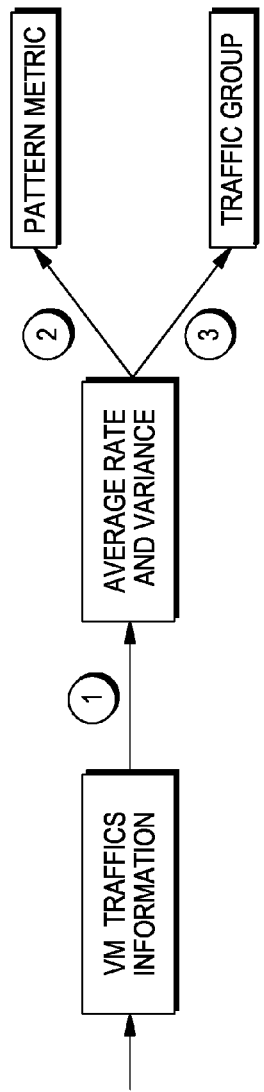
FIG. 4 depicts a three step process performed by an analysis engine of the apparatus.

The analysis engine 34 performs real time analysis in a three step process as illustrated in FIG. 4 per each session. In a first step, the analysis engine 34 receives the network traffic information from the VMs through the monitoring module 32 and determines the average rate and variance. This step may actually be divided into two substeps.

In a first substep step, the average packet rate for all VM pairs may be calculated for each session. One VM of each VM pair is a sending VM and the other VM of each pair is a receiving VM. For each VM pair, there is a set of average packet rates:

$$\text{rate}_{avg,i} = \frac{\sum \text{length}}{\text{interval}*60}$$

where "length" is the packet length and is summed for packets for each VM pair and where "interval" is the sample interval over which the $\text{rate}_{avg,i}$ is calculated. There is expected to be a set of $\text{rate}_{avg,i}$ values for multiple VM pairs with $\text{rate}_{avg,i}$ being one value in the set.

In a second substep, for each VM pair, the mathematical expectation and variance are calculated as follows:

$$\overline{\text{rate}} = \frac{\sum_{i=1}^{n}(\text{rate}_{avg,i})}{n}$$

where $\overline{\text{rate}}$ is the mathematical expectation. The mathematical expectation may also be referred to as the mean rate.

For example, in the exemplary embodiments, the monitoring module 32 may poll the virtual switch 24 and/or physical switch 26 at five minute intervals to get traffic information for each past five minute interval. After the monitoring module 32 gets all of the traffic information of a past five minute interval, the analysis engine 34 will calculate the average rate (rate$_{avg,i}$)/RTT of the past five minute interval. The mathematical expectation is the average of all saved five minute average rates.

The variance may be defined as the variance of the rate$_{avg, i}$ from the mathematical expectation is as follows:

$$\text{variance} = \frac{\sum_{i=1}^{n} (\text{rate}_{avg,i} - \overline{\text{rate}})^2}{n}$$

where variance is the variance of the rate$_{avg, i}$ from the mean rate. In other words, the variance measures how far the set of average rates, rate$_{avg,i}$, are spread out from the mathematical expectation for each session. The variance may be used to compare with predefined values in the pattern module 36 in the subsequent process.

Figure 5:
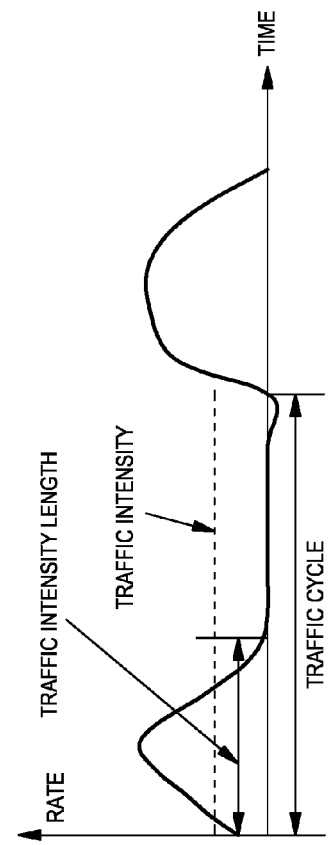
FIG. 5 depicts three metric values that may be determined in a network traffic pattern.

In a second step, three metric values may be determined for a pattern metric per each session. One metric value may be the network traffic cycle that may be defined as how often a burst of network traffic may happen. Another metric value may be the network traffic intensity length that may be defined as how long a burst of network traffic may last. The last metric value may be the network traffic intensity that may be defined as the average network traffic rate in the burst of network traffic. The metric values of the network traffic cycle, network traffic intensity length and the network traffic intensity are shown in FIG. 5.

In the third step, based on the VM traffic volume, VMs may be divided into groups by the analysis engine 34. There are many algorithms to handle this and may include k-means clustering algorithm and spanning tree algorithm. VMs may be divided into groups based on the traffic volume between VM pairs so that most traffic happens between VMs in the group. For example, assume there are 10 VMs: VM1 through VM10. For VMs 1 to 5, most of their traffic is between VM pairs in VMs 1 to 5, and there is little traffic between VMs 1 to 5 and other VMs. So VMs 1 to 5 should be put in the same group for traffic optimization.

Another example of dividing VMs into groups is as follows. Assume there may be ten VMs and the average packet rate difference between each of them may be known. All other metric values are determined per session, but in this step, average between VMs needs to be re-calculated from the session average rate. That is, the average packet rate between VMs was previously determined per session. Assume, for example, there are three sessions between VM1 and VM2. Then, for this step, the average packet rate of the three sessions is calculated to get the session average rate. For VM1, it may have a vector like this: (0, 100, 200, 200, 10, 10, 10, 10, 10, 10) with each number meaning the average packet rate, rate$_{avg,i}$, between VM1 and other VMs. This process may be simplified by assuming that if the number is smaller than 50, then treat it as 0. The vector then may be changed to (0, 100, 200, 200, 0, 0, 0, 0, 0, 0). Based on either of these vectors, all VMs may form a graph. The spanning tree algorithm may be used to split VMs into several groups.

The pattern module 36 may include a pattern detection engine, pattern meta data metrics and a pattern repository. The pattern repository may categorize information according to pattern metrics in a form such as that disclosed in FIG. 6, also shown as table 42 in FIG. 3. FIG. 6 and table 42 illustrate that the pattern in the pattern repository may have a pattern ID, network traffic cycle, network traffic intensity, network traffic intensity length, traffic variance threshold and RTT threshold. The traffic variance threshold is the optimum variance for the pattern. That is, the variance may be different for different sessions between different web servers and DB servers. The traffic variance threshold defines a criteria that variance larger that the traffic variance threshold may need to be optimized. Similarly, the RTT threshold defines a criteria that RTT larger that the RTT threshold may need to be optimized. In one exemplary embodiment, if either the variance or the RTT is larger than the traffic variance threshold or the RTT threshold, respectively, then there may be optimization by the optimization module 38. In another exemplary embodiment, if both the variance is larger than the traffic variance threshold and the RTT is larger than the RTT threshold, then there may be optimization by the optimization module 38.

Recall that the network traffic cycle, network traffic intensity and network traffic intensity length for the session was previously determined for VM pairs by the analysis engine 34. This information may be matched against patterns such as that shown in FIG. 6 and may be provided to the analysis engine 34. Each row in the pattern meta data metrics defines one network traffic usage status scenario. FIGS. 7A, 7B and 7C are three pattern meta data examples where "C" equals the network traffic cycle, "L" equals the network traffic intensity length and "I" equals the network traffic intensity.

If there is a pattern match, the network traffic variance and RTT for the VM pairs are compared with the pattern in the pattern repository such as table 42 shown in FIGS. 3 and 6. If the RTT is larger than the RTT threshold, the service quality may be impacted thereby indicating the network needs to be improved. If the variance is larger than the traffic variance threshold it also means the service quality may be impacted, thereby indicating the network needs to be improved to handle the network traffic bursts. This information may also be provided to the analysis engine 34.

The analysis engine 34, having received information from the pattern module 36 may then notify the optimization module 38 to optimize the network traffic of that VM group according to the following procedure.

The analysis engine 34 stores the following tables:
  A table to record a per session list of all average packet rates, rate$_{avg,i}$.
  A table shown as table 44 to record the per session traffic cycle, traffic intensity, traffic intensity length, traffic variance and traffic RTT for each VM pair.
  A table to record the VM pairs rate list, it is re-calculated from the table (above) to record a per session list of all average packet rates, rate$_{avg,i}$. The above table records the VM pair per session average rate list. For example, for a given VM pair (VM1, VM2), it may have two sessions (S1, S2) and each session has a list rate$_{avg,i}$. The average rate for each session will be calculated or obtained from the above table and then the averages will be summed and recorded for the VM pair (VM1, VM2) in the VM pairs rate list.
  A table to record VM groups, it is calculated from the table that records the VM pairs rate list.

The analysis engine 34 will match the row in table 44 to patterns in the pattern module 36. If there is a match, then the variance and RTT in Table 44 may be compared to the traffic variance threshold and RTT threshold in the pattern, such as table 42. In one exemplary embodiment, if either the variance is larger than the traffic variance threshold or the RTT is larger than the RTT threshold, then the analysis engine 34 may pass the VM IP address of the VM group to the optimization module 38 to optimize the network traffic. In another exemplary embodiment, if the variance is larger than the traffic variance threshold and the RTT is larger than the RTT threshold, then the analysis engine 34 may pass the VM IP address of the VM group to the optimization module 38 to optimize the network traffic.

Then optimization engine will choose a method to optimize the traffic.

The optimization module 38 provides optimization service for network traffic, and may include an optimization service component and an optimization rule component. The optimization service component is to provide optimization actions based on the analysis result received from the pattern module 36 and analysis engine 34 and use related rules predefined in the optimization rule component to reduce network traffic. The optimization rule component is to provide predefined optimizing rules for the optimization service.

Figure 8:
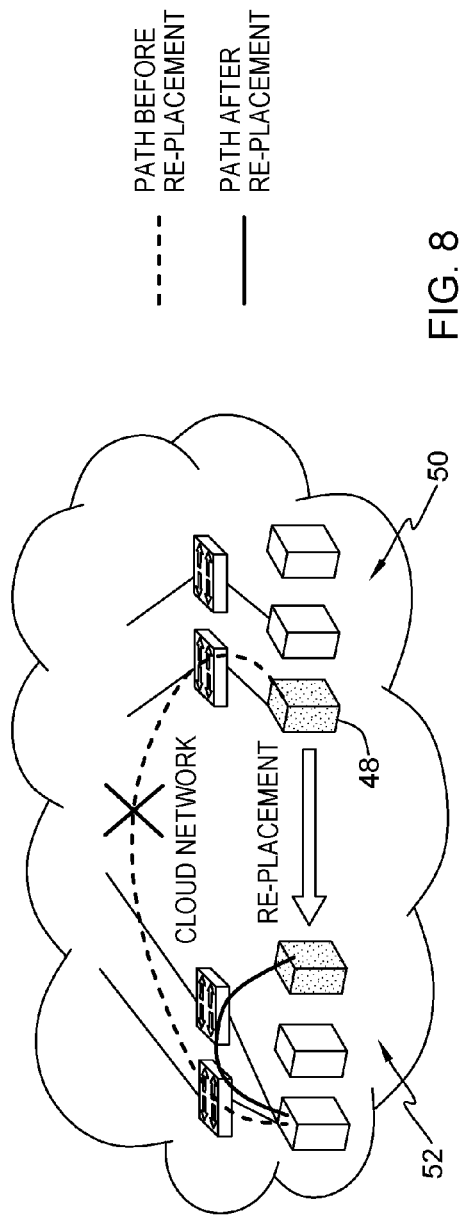
FIG. 8 depicts one optimization action in which there is re-placement of a virtual machine.

The network traffic may be optimized in two ways. One way may be by VM re-placement. Based on analysis value of the traffic pattern, a VM group may be moved so as to be placed in the same host, or in hosts in the same VLAN, or in hosts connected to the same routers. The criteria for moving a VM group may be based on efficient central processing unit (CPU) and memory utilization rate of related host servers, and network traffic among VM groups. FIG. 8 illustrates the re-placement of a VM group 48 from one group of hosts 50 to another group of hosts 52.

Figure 9:
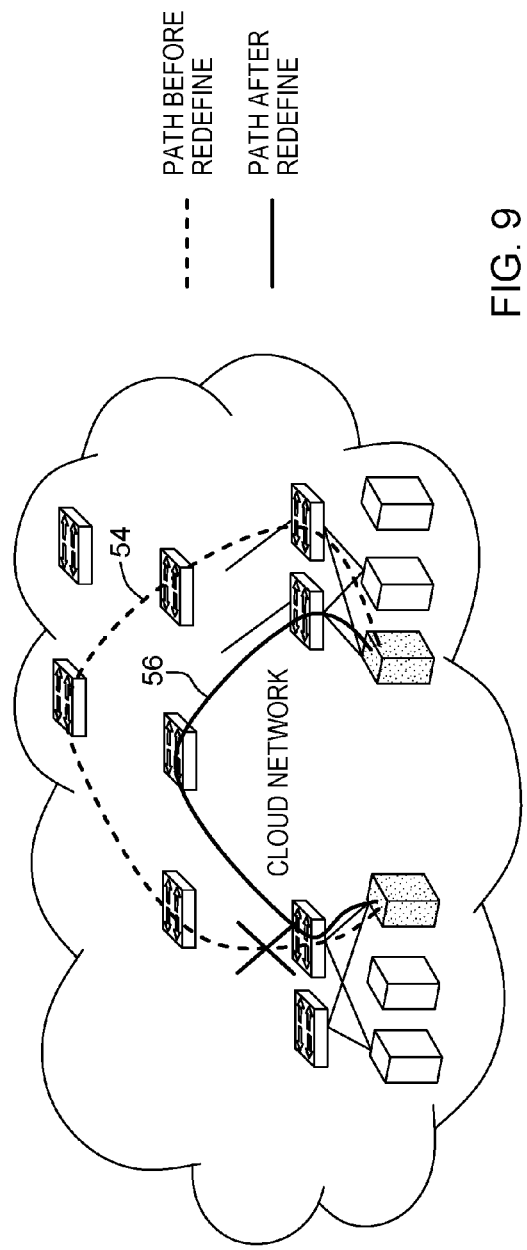
FIG. 9 depicts another optimization action in which a network data center path is redefined.

The second way may be to redefine the data center network path. After the network traffic pattern is determined, the software defined network (SDN) controller may find the proper path. Software-defined networking (SDN) is an approach to computer networking that allows network administrators to manage network services through abstraction of higher-level functionality. This is done by decoupling the system that makes decisions about where traffic is sent (the control plane) from the underlying systems that forward traffic to the selected destination (the data plane). FIG. 9 illustrates a redefinition of the network path 54 between VM groups before redefinition has been changed to network path 56 after redefinition. This option may not be available if there is no SDN controller.

Figure 10:
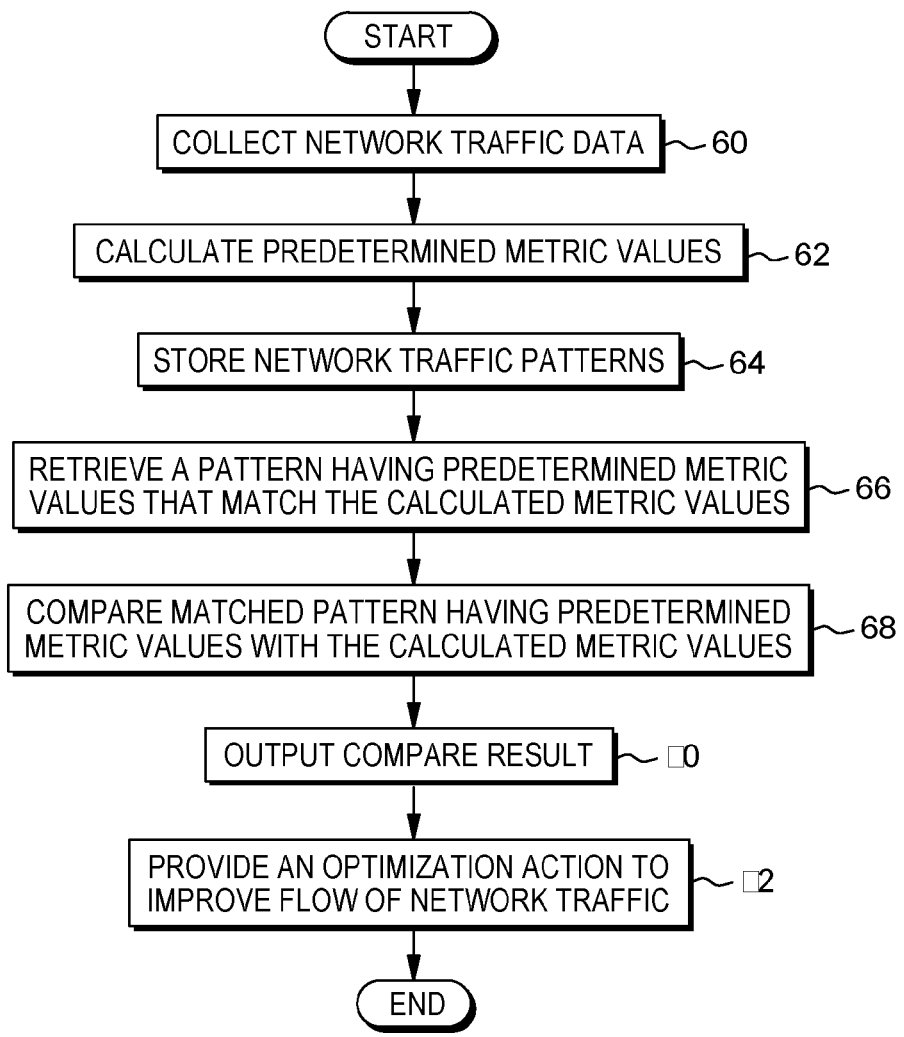
FIG. 10 depicts an exemplary embodiment of a method for optimizing network traffic.

Referring now to FIG. 10, there is a flow chart for an exemplary method of optimizing network traffic in a network environment. In the method, there may be one or more host computers having VMs. The VMs may have a placement with respect to the one or more host computers. That is, the VMs may be placed to be with a particular host or with a particular VLAN or be connected to a particular router.

In a first step, network traffic data may be collected from the VMs by a monitoring module (box 60 in FIG. 10), such as monitoring 32 shown in FIG. 3.

The network traffic data from the monitoring module may then be received by an analysis engine, such as analysis engine 34 in FIG. 3. Thereafter, predetermined metric values pertaining to the network traffic data may be calculated by the analysis engine (box 62 FIG. 10). The predetermined metric values may be any or all of the network traffic cycle, network traffic intensity and network traffic intensity length discussed previously. The predetermined metric values may further include the variance (may also be referred to as the network traffic variance) and RTT as discussed above.

There may be a pattern repository in the pattern module in which pattern module network traffic patterns having predetermined metric values may be stored (box 64, FIG. 10).

Next, the pattern module may retrieve a network traffic pattern having the predetermined metric values from the pattern repository that may match the calculated predetermined metric values (box 66, FIG. 10).

The pattern module may provide the matched network traffic pattern to the analysis engine. The analysis engine may compare the calculated predetermined metric values to the matched network traffic pattern predetermined metric values (box 68, FIG. 10).

The analysis engine may further provide an output of a result of the comparing of the calculated predetermined metric values to the matched network pattern predetermined metric values (box 70, FIG. 10).

An optimization module may receive the output from the analysis engine. Then, the optimization module may provide an optimization action to the VMs to improve the flow of the network traffic between the VMs. The optimization action may be either or both of the actions depicted in FIGS. 8 and 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. An apparatus for optimizing network traffic comprising:
    at least one host computer having virtual machines (VMs) and a virtual machine placement of the VMs with respect to the at least one host computer;
    a monitoring module to collect network traffic data from the VMs wherein network traffic data is an amount of data moving across a network at a given point in time;
    an analysis engine to receive the network traffic data from the monitoring module and to calculate predetermined metric values pertaining to the network traffic data wherein the predetermined metric values are a network traffic variance and an RTT wherein the network traffic variance is defined as the difference in a set of average data packet rates from a mathematical expectation of the average data packet rates per network session and the RTT is defined as a length of time it takes a data packet to be sent to a destination VM plus the length of time it takes for an acknowledgement of receipt of that data packet to be received by a sending VM;
    a pattern module to store network traffic patterns having predetermined metric values and to provide the network traffic patterns to the analysis engine, the analysis engine compares the calculated predetermined metric values to the network traffic pattern predetermined metric values and provides an output of a result of the compare of the calculated predetermined metric values to the network pattern predetermined metric values; and
    responsive to receipt of the output from the analysis engine, an optimization module processes the output and provides an optimization action to the VMs to improve the flow of the network traffic between the VMs.

2. The apparatus of claim 1 wherein the optimization action is to move one or more of the VMs from one placement to another placement.

3. The apparatus of claim 1 wherein the optimization action is to move one or more of the VMs to be with a same host as another VM, to move one or more of the VMs to be with a same host in a same VLAN or to move one or more of the VMs to hosts that are connected by a same router.

4. The apparatus of claim 1 wherein the optimization action is to change a network data path from one or more VMs to another one or more VMs.

5. The apparatus of claim 1 wherein the predetermined metric values further comprise a network traffic cycle, a network traffic intensity, and a network traffic intensity length, wherein the network traffic cycle is defined as how often a burst of network traffic may happen, the network traffic intensity length is defined as how long a burst of network traffic may last and the network traffic intensity is defined as an average network traffic rate in the burst of network traffic.

6. The apparatus of claim 1 wherein the at least one host computer and the VMs are in a cloud environment.

7. A computer implemented method of optimizing network traffic in a network environment comprising at least one host computer having virtual machines (VMs) and a virtual machine placement of the VMs with respect to the at least one host computer, the method comprising:
    collecting by a monitoring module network traffic data from the VMs wherein network traffic data is an amount of data moving across a network at a given point in time;
    receiving by an analysis engine the network traffic data from the monitoring module;
    calculating by the analysis engine predetermined metric values pertaining to the network traffic data wherein the predetermined metric values are a network traffic variance and an RTT wherein the network traffic variance is defined as the difference in a set of average data packet rates from a mathematical expectation of the average data packet rates per network session and the RTT is defined as a length of time it takes a data packet to be sent to a destination VM plus the length of time it takes for an acknowledgement of receipt of that data packet to be received by a sending VM;
    storing in a pattern module network traffic patterns having predetermined metric values;
    retrieving by the pattern module a matched network traffic pattern having the predetermined metric values matching the calculated predetermined metric values;
    providing by the pattern module the matched network traffic patterns to the analysis engine;
    comparing by the analysis engine the calculated predetermined metric values to the matched network traffic pattern predetermined metric values and providing an output of a result of the comparing of the calculated predetermined metric values to the matched network pattern predetermined metric values; and
    responsive to receiving by an optimization module the output from the analysis engine, providing by the optimization module an optimization action to the VMs to improve the flow of the network traffic between the VMs.

8. The computer implemented method of claim 7 wherein the optimization action is moving one or more of the VMs from one placement to another placement.

9. The computer implemented method of claim 7 wherein the optimization action is moving one or more of the VMs to be with a same host as another VM, moving one or more of the VMs to be with a same host in a same VLAN or moving one or more of the VMs to hosts that are connected by a same router.

10. The computer implemented method of claim 7 wherein the optimization action is changing a network data path from one or more VMs to another one or more VMs.

11. The computer implemented method of claim 7 wherein the predetermined metric values further comprise a network traffic cycle, a network traffic intensity, and a network traffic intensity length, wherein the network traffic cycle is defined as how often a burst of network traffic may happen, the network traffic intensity length is defined as how long a burst of network traffic may last and the network traffic intensity is defined as an average network traffic rate in the burst of network traffic.

12. The computer implemented method of claim 7 wherein the at least one host computer and the VMs are in a cloud environment.

13. A computer program product for optimizing network traffic in a network environment, the computer program product comprising a computer readable storage medium having program instruction embodied therewith, the program instructions executable by a computer environment comprising at least one host computer having virtual machines (VMs) and a virtual machine placement of the VMs with respect to the at least one host computer to cause the computer environment to perform a method comprising:
    collecting by a monitoring module network traffic data from the VMs wherein network traffic data is an amount of data moving across a network at a given point in time;
    receiving by an analysis engine the network traffic data from the monitoring module;
    calculating by the analysis engine predetermined metric values pertaining to the network traffic data wherein the predetermined metric values are a network traffic variance and an RTT wherein the network traffic variance is defined as the difference in a set of average data packet rates from a mathematical expectation of the average data packet rates per network session and the RTT is defined as a length of time it takes a data packet to be sent to a destination VM plus the length of time it takes for an acknowledgement of receipt of that data packet to be received by a sending VM;
    storing in a pattern module network traffic patterns having predetermined metric values;
    retrieving by the pattern module a matched network traffic pattern having the predetermined metric values matching the calculated predetermined metric values;
    providing by the pattern module the matched network traffic patterns to the analysis engine;
    comparing by the analysis engine the calculated predetermined metric values to the matched network traffic pattern predetermined metric values and providing an output of a result of the comparing of the calculated predetermined metric values to the matched network pattern predetermined metric values; and
    responsive to receiving by an optimization module the output from the analysis engine, providing by the optimization module an optimization action to the VMs to improve the flow of the network traffic between the VMs.

14. The computer program product of claim 13 wherein the optimization action is moving one or more of the VMs from one placement to another placement.

15. The computer program product of claim 13 wherein the optimization action is moving one or more of the VMs to be with a same host as another VM, moving one or more of the VMs to be with a same host in a same VLAN or moving one or more of the VMs to hosts that are connected by a same router.

16. The computer program product of claim 13 wherein the optimization action is changing a network data path from one or more VMs to another one or more VMs.

17. The computer program product of claim 13 wherein the at least one host computer and the VMs are in a cloud environment.

18. The computer program product of claim 13 wherein the predetermined metric values further comprise a network traffic cycle, a network traffic intensity, and a network traffic intensity length, wherein the network traffic cycle is defined as how often a burst of network traffic may happen, the network traffic intensity length is defined as how long a burst of network traffic may last and the network traffic intensity is defined as an average network traffic rate in the burst of network traffic.

* * * * *